US011210665B2

(12) United States Patent
Tierney et al.

(10) Patent No.: US 11,210,665 B2
(45) Date of Patent: Dec. 28, 2021

(54) MANAGING CUSTOMER UNIQUENESS IN TOKENISED SYSTEMS

(71) Applicant: MasterCard International Incorporated, Purchase, NY (US)

(72) Inventors: John Tierney, Heswall (GB); James Christian Noe, West Wickham (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1170 days.

(21) Appl. No.: 15/235,386

(22) Filed: Aug. 12, 2016

(65) Prior Publication Data

US 2017/0046691 A1 Feb. 16, 2017

(30) Foreign Application Priority Data

Aug. 14, 2015 (EP) ..................................... 15181150

(51) Int. Cl.
*G06Q 20/40* (2012.01)
*G06Q 20/38* (2012.01)
*G06Q 20/22* (2012.01)

(52) U.S. Cl.
CPC ......... *G06Q 20/385* (2013.01); *G06Q 20/227* (2013.01); *G06Q 20/3821* (2013.01); *G06Q 20/40* (2013.01)

(58) Field of Classification Search
USPC .......................................................... 705/44
See application file for complete search history.

(56) References Cited

U.S. PATENT DOCUMENTS 7,006,993 B1 2/2006 Cheong
7,299,974 B2 11/2007 Smets
(Continued)

FOREIGN PATENT DOCUMENTS

CN 108140181 A 6/2018
CN 108140191 A 6/2018
(Continued)

OTHER PUBLICATIONS

European Patent Office, extended European Search Report for EP Application 15181148.6, dated Sep. 21, 2015, pp. 1-9.
(Continued)

*Primary Examiner* — Hani M Kazimi
*Assistant Examiner* — Hatem M Ali
(74) *Attorney, Agent, or Firm* — Otterstedt, Wallace & Kammer, LLP

(57) ABSTRACT

According to one aspect there is provided a method comprising a secondary payment device: receiving a device primary account number (DPAN) and a funding source proxy (FSP) derived from a funding primary account number (FPAN) of a funding source according to a predetermined algorithm; and transmitting a secondary payment device transaction request comprising said DPAN and said FSP to a payment terminal. According to another aspect there is provided a method comprising a payment terminal: receiving a secondary payment device transaction request comprising a device primary account number (DPAN) and a funding source proxy (FSP) derived from a funding primary account number (FPAN) of a funding source according to a predetermined algorithm; responsive thereto, determining that the FSP is not present on a deny list stored at the payment terminal; and responsive thereto, authorizing said secondary payment device transaction request.

5 Claims, 8 Drawing Sheets

(56) References Cited

U.S. PATENT DOCUMENTS

| | | | |
|---|---|---|---|
| 7,347,361 | B2 | 3/2008 | Lovett |
| 8,341,084 | B2 | 12/2012 | Cowen |
| 8,346,639 | B2 | 1/2013 | Hammad et al. |
| 9,947,001 | B2 | 4/2018 | Smith et al. |
| 2006/0178937 | A1 | 8/2006 | Rau |
| 2006/0278698 | A1 | 12/2006 | Lovett |
| 2008/0203152 | A1 | 8/2008 | Hammad et al. |
| 2011/0004551 | A1 | 1/2011 | Armes |
| 2011/0082767 | A1 | 4/2011 | Ryu |
| 2013/0036048 | A1 | 2/2013 | Campos |
| 2013/0103574 | A1 | 4/2013 | Conrad |
| 2013/0148024 | A1 | 6/2013 | Shin |
| 2013/0185211 | A1 | 7/2013 | Cowen |
| 2013/0238408 | A1* | 9/2013 | Cooke ............... G06Q 30/0207 705/14.3 |
| 2013/0332337 | A1 | 12/2013 | Tran |
| 2014/0040149 | A1* | 2/2014 | Fiske ............... G06Q 20/3278 705/71 |
| 2014/0058938 | A1 | 2/2014 | McClung, III |
| 2014/0164228 | A1* | 6/2014 | Pathak ............... G06Q 20/36 705/39 |
| 2014/0279559 | A1* | 9/2014 | Smith ............... G06Q 20/3265 705/71 |
| 2015/0019439 | A1* | 1/2015 | Phillips ............... G06Q 20/363 705/64 |
| 2015/0134540 | A1 | 5/2015 | Law |
| 2015/0227920 | A1* | 8/2015 | Sadiq ............... G06Q 20/1085 705/44 |
| 2015/0262160 | A1 | 9/2015 | Hursta |
| 2016/0162882 | A1 | 6/2016 | McClung, III |
| 2016/0267467 | A1 | 9/2016 | Rutherford |
| 2017/0046690 | A1 | 2/2017 | Tierney |
| 2017/0046691 | A1 | 2/2017 | Tierney et al. |
| 2017/0330181 | A1 | 11/2017 | Ortiz |
| 2018/0144339 | A1 | 5/2018 | Beidas |
| 2018/0293573 | A1 | 10/2018 | Ortiz |
| 2018/0300724 | A1 | 10/2018 | Vokes |
| 2019/0005496 | A1 | 1/2019 | Noe et al. |

FOREIGN PATENT DOCUMENTS

| | | |
|---|---|---|
| CN | 108352017 A | 7/2018 |
| EP | 3131042 A1 | 2/2017 |
| EP | 3131043 A1 | 2/2017 |
| EP | 3335172 A1 | 6/2018 |
| JP | 2005196463 A | 7/2005 |
| JP | 2009129377 A | 6/2009 |
| RU | 2007138849 A | 4/2009 |
| RU | 2009113534 A | 10/2010 |
| RU | 2011151051 A | 6/2013 |
| RU | 2011153984 A | 7/2013 |
| RU | 2692969 C1 | 6/2019 |
| RU | 2693333 C1 | 7/2019 |
| RU | 2693597 C1 | 7/2019 |
| WO | WO2017029596 A1 | 2/2017 |
| WO | WO2017030933 A1 | 2/2017 |
| WO | WO2017030936 A1 | 2/2017 |

OTHER PUBLICATIONS

European Patent Office, extended European Search Report for EP Application 15181150.2, dated Sep. 17, 2015, pp. 1-8.
John Tierney et al., unpublished US Patent Application filed Aug. 12, 2016 and entitled Managing Customer Uniqueness in Tokenised Systems, pp. 1-33 plus 8 sheets drawings, U.S. Appl. No. 15/235,338.
Authorized Officer William Blackley, EPO as ISA, PCT International Search Report PCT/IB2016/054865, dated Feb. 23, 2017 pp. 1-4.
Authorized Officer William Blackley, EPO as ISA, PCT Written Opinion of the ISA PCT/IB2016/054865, dated Feb. 23, 2017 pp. 1-11.
Richard Kissel (ed.), "Glossary of Key Information Security Terms", National Institute of Standards and Technology (NIST) Interagency Report (IR) 7298 Revision 2, May 2013, 222 pages.

* cited by examiner

MANAGING CUSTOMER UNIQUENESS IN TOKENISED SYSTEMS

CROSS-REFERENCE TO RELATED APPLICATIONS

This application claims foreign priority to EP application 15181150.2 filed 14 Aug. 2015, the complete disclosure of which is expressly incorporated herein by reference in its entirety for all purposes.

FIELD OF THE INVENTION

The present disclosure relates to methods of identifying the funding sources of electronic transactions. It further relates to methods of performing, authorizing or blocking electronic transactions. It also relates to methods of provisioning devices with payment capabilities.

BACKGROUND

Traditional card payment models allowed identification of the funding source of electronic transactions since there was a one to one correspondence between the PAN (primary account number) displayed on the credit or debit card and the account from which funds were drawn for transactions using said card. In the event of a many to one relationship (e.g. a joint account), the card details remain within the issuer's sole control. However, with the introduction of secondary payment devices such as key fobs, stickers and payment-enabled mobile devices (smartphones, tablets, smartwatches etc.), this one to one correspondence is potentially lost since the secondary payment devices may use a different PAN to the original card. Secondary payment devices that use tokenised PANs will lose this one to one correspondence. This is because, for security reasons, when each new secondary payment device is set up to provide payment functionalities (e.g. by NFC, near field communication, with payment terminals), it is provisioned with a unique token known as a DPAN (device PAN), different to the FPAN (funding PAN) on the card linked to the account. The DPAN is the PAN the device passes to merchant terminals to make payments. Merchant systems are agnostic as to whether they are passed DPANs or FPANs; payments are processed in the same way from their perspective. However, this means that merchants have no way of knowing that a FPAN and one or more DPANs used to make transactions at their terminals are all funded from the same account.

Tokenisation may also be used as a way of securing chip and contactless card transactions, i.e. when a chip or contactless card communicates with a payment terminal, it provides a tokenised PAN as a surrogate for the PAN actually printed/embossed on the card. U.S. provisional patent application No. 62/132,300 filed 12 Mar. 2015 describes systems and methods which allow payment cards (including contact and contactless chip payment cards and mobile devices) to be personalised in a way which permits the use of payment tokens as well as standard PANs.

U.S. patent application Ser. No. 14/514,290 filed 14 Oct. 2014 is concerned with improving the security of tokenised transactions by providing, along with a token, a token assurance level and data used to generate the token assurance level. As described therein, at the time a token is issued, one or more identification and verification methods are performed to ensure the token is replacing a PAN that was legitimately used by a token requestor and a token assurance level is assigned accordingly.

SUMMARY

According to a first aspect there is provided a method of identifying the funding source of an electronic transaction, said method comprising a payment terminal: receiving a transaction request comprising one or more credentials from a payment device; and determining whether said credentials comprise a funding source proxy (FSP) and, if not, generating the FSP from one or more of said credentials according to a predetermined algorithm stored on said payment terminal; wherein the FSP is derived from a funding primary account number (FPAN) of a funding source of said payment device.

According to a second aspect there is provided a method of blocking an electronic transaction, said method comprising a payment terminal: receiving a transaction request comprising one or more credentials from a payment device; determining whether said credentials comprise a funding source proxy (FSP) and, if not, generating the FSP from one or more of said credentials according to a predetermined algorithm stored on said payment terminal; determining that said FSP is present on a deny list stored on the payment terminal; and declining said transaction request; wherein the FSP is derived from a funding primary account number (FPAN) of a funding source of said payment device.

According to a third aspect there is provided a method of authorising an electronic transaction, said method comprising a payment terminal: receiving a transaction request comprising one or more credentials from a payment device; determining whether said credentials comprise a funding source proxy (FSP) and, if not, generating the FSP from one or more of said credentials according to a predetermined algorithm stored on said payment terminal; determining that said FSP is not present on a deny list stored on the payment terminal; and authorising said transaction request; wherein the FSP is derived from a funding primary account number (FPAN) of a funding source of said payment device.

According to a fourth aspect there is provided a method comprising a payment terminal: receiving a primary device transaction request comprising a funding primary account number (FPAN) of a funding source; responsive thereto, generating a funding source proxy (FSP) from said FPAN according to a predetermined algorithm stored on the payment terminal; responsive thereto, determining that said generated FSP is not present on a deny list stored at the payment terminal; responsive thereto, authorising said primary device transaction request; issuing a request comprising the FPAN to a payment network for settlement of said transaction; subsequent to issuing said request comprising the FPAN to said payment network, receiving a primary device transaction failed message from the payment network; and responsive thereto, adding the FSP to said deny list; the payment terminal subsequently: receiving a secondary payment device transaction request comprising a device primary account number (DPAN) and the FSP; determining that the received FSP is present on the deny list; and declining said secondary payment device transaction request.

According to a fifth aspect there is provided a method of provisioning a device with payment capability, said method comprising providing said device with a device primary account number (DPAN) and a funding source proxy (FSP)

derived from a funding primary account number (FPAN) of a funding source according to a predetermined algorithm.

According to a sixth aspect there is provided a method comprising a secondary payment device: receiving a device primary account number (DPAN) and a funding source proxy (FSP) derived from a funding primary account number (FPAN) of a funding source according to a predetermined algorithm; and transmitting a secondary payment device transaction request comprising said DPAN and said FSP to a payment terminal.

The DPAN and the FSP could be received in a signed or encrypted record.

The method could further comprise a payment terminal: receiving said secondary payment device transaction request; responsive thereto, determining that the received FSP is not present on a deny list stored at the payment terminal; and responsive thereto, authorising said secondary payment device transaction request.

The method could further comprise said payment terminal issuing a request comprising the DPAN to a payment network for settlement of said transaction.

The method could further comprise the payment terminal: subsequent to issuing said request comprising the DPAN to said payment network, receiving a secondary payment device transaction failed message from the payment network; and responsive thereto, adding the FSP to said deny list.

The method could further comprise the payment terminal, subsequent to adding the FSP to the deny list: receiving a primary device transaction request comprising said FPAN; responsive thereto, generating the FSP from the received FPAN according to said predetermined algorithm stored on the payment terminal; responsive thereto, determining that said generated FSP is present on the deny list; and responsive thereto, declining said primary device transaction request.

The method could further comprise the payment terminal, subsequent to issuing said request comprising the DPAN to said payment network, receiving a secondary payment device transaction approved message from the payment network.

The method could further comprise the payment terminal, subsequent to receiving said secondary payment device transaction approved message: receiving a primary device transaction request comprising said FPAN; responsive thereto, generating the FSP from the received FPAN according to said predetermined algorithm stored on the payment terminal; responsive thereto, determining that said generated FSP is not present on the deny list; and responsive thereto, authorising said primary device transaction request.

The method could further comprise the payment terminal, subsequent to receiving said secondary payment device transaction approved message: receiving a primary device transaction request comprising said FPAN; responsive thereto, generating the FSP from the received FPAN according to said predetermined algorithm stored on the payment terminal; responsive thereto, determining that said generated FSP is not present on the deny list; responsive thereto, authorising said primary device transaction request; issuing a request comprising the FPAN to a payment network for settlement of said transaction; subsequent thereto, receiving a primary device transaction failed message from the payment network; and responsive thereto, adding the FSP to a deny list stored at the payment terminal.

The method could further comprise the payment terminal, prior to receiving said secondary payment device transaction request: receiving a primary device transaction request comprising said FPAN; responsive thereto, generating the FSP from the received FPAN according to said predetermined algorithm stored on the payment terminal; responsive thereto, determining that the FSP is not present on a deny list stored at the payment terminal; responsive thereto, authorising said primary device transaction request; issuing a request comprising the FPAN to a payment network for settlement of said transaction; subsequent to issuing said request comprising the FPAN to said payment network, receiving a primary device transaction failed message from the payment network; and responsive thereto, adding the FSP to a deny list stored at the payment terminal; the payment terminal subsequently: receiving said secondary payment device transaction request; responsive thereto, determining that the received FSP is present on said deny list; and responsive thereto, declining said secondary payment device transaction request.

The method could further comprise the payment terminal, prior to receiving said secondary payment device transaction request: receiving a primary device transaction request comprising said FPAN; responsive thereto, generating the FSP from the received FPAN according to said predetermined algorithm stored on the payment terminal; responsive thereto, determining that the FSP is not present on a deny list stored at the payment terminal; responsive thereto, authorising said primary device transaction request; issuing a request comprising the FPAN to a payment network for settlement of said transaction; and subsequent to issuing said request comprising the FPAN to said payment network, receiving a primary device transaction approved message from the payment network.

According to a seventh aspect there is provided a method comprising a payment terminal: receiving a secondary payment device transaction request comprising a device primary account number (DPAN) and a funding source proxy (FSP) derived from a funding primary account number (FPAN) of a funding source according to a predetermined algorithm; responsive thereto, determining that the FSP is not present on a deny list stored at the payment terminal; and responsive thereto, authorising said secondary payment device transaction request.

The method could further comprise said payment terminal issuing a request comprising the DPAN to a payment network for settlement of said transaction.

The method could further comprise the payment terminal: subsequent to issuing said request comprising the DPAN to said payment network, receiving a secondary payment device transaction failed message from the payment network; and responsive thereto, adding the FSP to said deny list.

The method could further comprise the payment terminal, subsequent to adding the FSP to the deny list: receiving a primary device transaction request comprising said FPAN; responsive thereto, generating the FSP from the received FPAN according to said predetermined algorithm stored on the payment terminal; responsive thereto, determining that said generated FSP is present on the deny list; and responsive thereto, declining said primary device transaction request.

The method could further comprise the payment terminal, subsequent to issuing said request comprising the DPAN to said payment network, receiving a secondary payment device transaction approved message from the payment network.

The method could further comprise the payment terminal, subsequent to receiving said secondary payment device transaction approved message: receiving a primary device transaction request comprising said FPAN; responsive thereto, generating the FSP from the received FPAN according to said predetermined algorithm stored on the payment terminal; responsive thereto, determining that said generated FSP is not present on the deny list; and responsive thereto, authorising said primary device transaction request.

The method could further comprise the payment terminal, subsequent to receiving said secondary payment device transaction approved message: receiving a primary device transaction request comprising said FPAN; responsive thereto, generating the FSP from the received FPAN according to said predetermined algorithm stored on the payment terminal; responsive thereto, determining that said generated FSP is not present on the deny list; responsive thereto, authorising said primary device transaction request; issuing a request comprising the FPAN to a payment network for settlement of said transaction; subsequent thereto, receiving a primary device transaction failed message from the payment network; and responsive thereto, adding the FSP to a deny list stored at the payment terminal.

The method could further comprising the payment terminal, prior to receiving said secondary payment device transaction request: receiving a primary device transaction request comprising said FPAN; responsive thereto, generating the FSP from the received FPAN according to said predetermined algorithm stored on the payment terminal; responsive thereto, determining that the FSP is not present on a deny list stored at the payment terminal; responsive thereto, authorising said primary device transaction request; issuing a request comprising the FPAN to a payment network for settlement of said transaction; and subsequent to issuing said request comprising the FPAN to said payment network, receiving a primary device transaction approved message from the payment network.

Said credentials of any of the first to third or sixth to seventh aspects could comprise one or more of: a funding PAN (FPAN), a device PAN (DPAN), an expiry date and a serial number.

According to an eighth aspect there is provided a system comprising a secondary payment device and a payment terminal, configured to perform the method of either of the sixth or seventh aspects.

According to a ninth aspect there is provided a payment terminal configured to perform the method of either of the sixth or seventh aspects.

Said predetermined algorithm of any of the aspects could generate the FSP in such a way that: said FPAN cannot be determined from the FSP; and/or each possible value of said FPAN uniquely maps to a different FSP. The predetermined algorithm could comprise a cryptographic hash function.

Said predetermined algorithm of any of the aspects could use an expiry date and/or a serial number.

The FSP of any of the aspects could be a payment account reference (PAR) as defined by EMVCo specifications.

BRIEF DESCRIPTION OF THE DRAWINGS

Implementations will now be described in detail, by way of example only, with reference to the accompanying drawings, in which.

DETAILED DESCRIPTION

Figure 1:
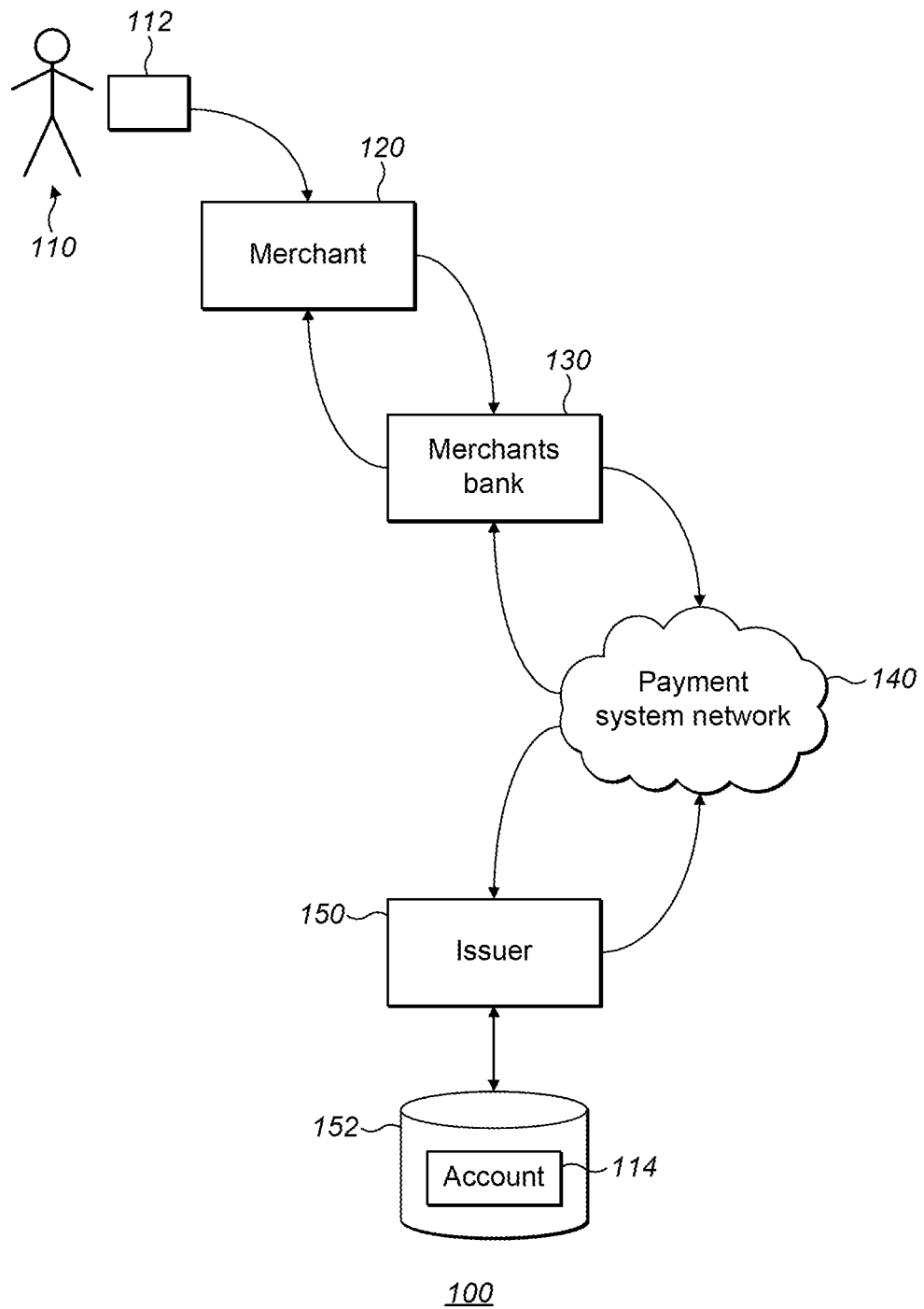
FIG. 1 shows an example multi-party payment transaction system.

FIG. 1 shows an example multi-party payment transaction system 100 for enabling payment-by-card or similar transactions by a customer 110 (e.g., a cardholder, a user, and the like) at a merchant 120 (e.g., a transit agency). An issuer 150, usually a financial institution such as a bank, establishes for the customer 110 a customer's account 114 and stores and updates data in association with that account, for example, in a database 152. The issuer 150 also provides the customer 110 with a payment device 112, such as a credit, debit, prepaid or commercial card and/or its equivalent in association with the customer's account 114.

A payment transaction is initiated when the customer 110 uses the payment device 112 to tender a payment for a purchase from the merchant 120, usually at a point of sale (POS) terminal (not shown). A series of exchanges between the parties depicted in FIG. 1 is then required to complete the transaction. These exchanges may generally be viewed as being conducted in four stages: (1) card-reader interaction, (2) authorisation, (3) clearing, and (4) settlement (where steps (2) and (3) may occur simultaneously).

At the card-reader interaction stage, the merchant 120 captures (reads, receives, or the like) payment device credentials from the payment device 112. For example, the customer 110 may tap his or her contactless payment card or an NFC-enabled mobile payment device against an NFC enabled reader of the POS terminal to allow the POS terminal to read the payment device credentials, including customer account information, from a chip, a secure element or a Trusted Execution Environment (TEE) embedded in the payment device 112, or from the device's memory in the case of Host Card Emulation (also known as Cloud Based Payments).

During the authorisation stage, the identity of the customer's account, the authenticity of the payment device 112, and the availability of funds in the customer's account 114 are confirmed. Additionally, at some merchants (including some transit merchants), the terminal verifies a CDA (Combined DDA/AC generation, where DDA stands for Dynamic Data Authentication and AC stands for Application Cryptogram) signature. The merchant 120 transmits electronically some or all of the information captured from the payment device to the transaction processing generators of a merchant's bank 130 (or an acquirer/an acquiring bank) to request authorisation of the transaction. The request may also include the transaction amount, such as the purchase amount.

A payment system network 140, such as the MasterCard™ payment-processing network, facilitates communications between the generators of the merchant's bank 130 and the generators of the issuer 150, which in turn determine whether to authorise or decline the payment. If the issuer 150 authorises the payment, it decreases availability of funds on the consumer's account 114 accordingly and issues an authorisation code to the merchant 120. The authorisation code is transmitted back to the merchant 120 via the payment system network 140 and the merchant's bank 130.

During the clearing stage, (which may occur together with authorisation) the payment system network 140 facilitates transmission of the transaction data between the parties to ensure that all parties have the necessary and correct information for settling the transaction, and that the transaction is settled according to the payment guidelines and rules established by the payment system network 140. Finally, during the settlement stage, the payment system network 140 facilitates the exchange of funds so that the appropriate parties are paid in relation to the transaction.

In the context of multiple transactions for small amounts with a single merchant being made over a relatively short period, such as with transit payments (trains, underground, ferry, parking, tolls, and the like), a somewhat different approach to processing payment transactions is often employed. More specifically, the individual charges (e.g., individual fares) are typically small, and thus the merchant 120, such as a transit agency, may elect to aggregate all transit transactions involving the payment device 112 over a certain period of time (a few hours, a day, a weekend, a week, a certain number of transactions etc.)—called an aggregation period—before clearing and settling all the transactions for the total amount. The individual charges are aggregated over the aggregation period and then settled in accordance with the rules of the payment system network 140.

For example, consider a scenario of a customer 110 entering a transit system by tapping the payment device 112 at a point of entry to the transit system (such as a transit agency's validator, gate, POS terminal, or any other suitable entry point). Provided that the payment device 112 is valid and is not currently blocked by the transit agency from travel (e.g., for a prior non-payment), the customer 110 is typically allowed to travel prior to the transit agency 120 seeking authorisation from the issuer 150. It is the nature of the transit services that a large number of travelers (commuters, and the like) need to enter and exit the transit system in short periods of time. At the same time, transit agencies often suffer from lack of high speed and/or reliable communication infrastructure (a particularly acute problem where the customer 110 has to validate themselves at a mobile entry point, e.g. on board a bus). Accordingly, to accommodate consumer demand for transit services in a timely manner, consumers are generally allowed to travel before the authorisation is obtained from the issuer 150.

Whilst the customer 110 is travelling, and if required by payment system rules, payment credentials read from the payment device 112 at the point of entry are incorporated by the transit agency 120 into the respective transaction and passed to the merchant's bank 130 as a part of a transit aggregation request. The merchant's bank 130 in turn passes the transit aggregation request to the payment system network 140, which passes it to the issuer 150. The issuer 150 evaluates whether a new aggregation period may be started and provides its response to the transit agency 120 via the payment network 140 and merchant's bank 130.

If the transit agency 120 receives an authorisation response indicating that the aggregation request has been approved, the transit agency 120 now may receive further taps from the payment device 112 around the transit network and calculate charges (fares), for example based on where, when, and which mode of transport the customer 110 used. Upon expiration of the aggregation period (e.g., a certain charge amount has been accumulated by the customer 110, a certain time period has passed etc.), the transit agency 120 submits a singular transaction for an amount totaling all charges accumulated by the customer 110 during the aggregation period for clearing and settling in accordance with the standard clearing and settlement procedures established by the payment system network 140. Alternatively, some local rules may allow a transit agency to submit multiple clearing records against one good authorisation until a threshold amount is passed. For example, if the merchant is a transit agency, travel on a card can be cleared every day the card is used (thus making consumers' statements clearer) until a total aggregation threshold is exceeded, at which point a new authorisation is required in order to allow aggregation to continue unhindered.

Alternatively, a transit agency 120 may use a deferred authorisation scheme, in accordance with which the customer 110 is charged for each transit transaction individually. However, due to the above-described constraints experienced by the transit agencies, the authorisation of each transaction is performed after the customer 110 has been allowed to travel. Regardless of whether the transit agency 120 employs the aggregation or deferred authorisation scheme, however, the transit agency captures payment device credentials at the point of entry into the transit network.

Figure 2B:
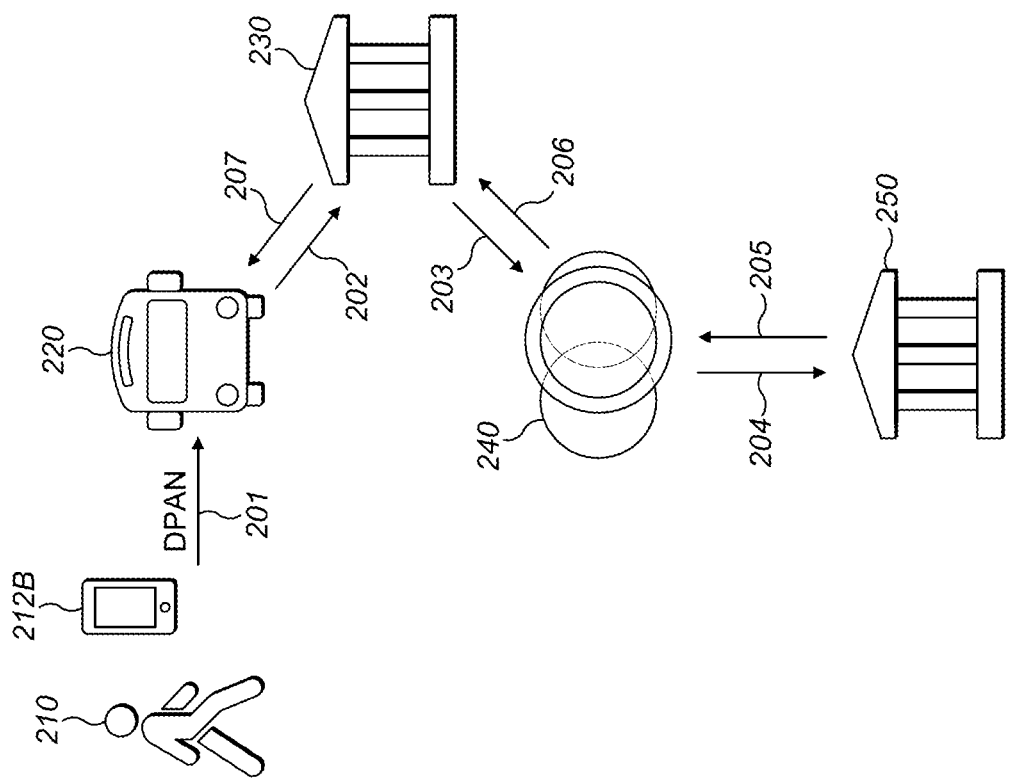
FIG. 2B illustrates another message flow.
Figure 2A:
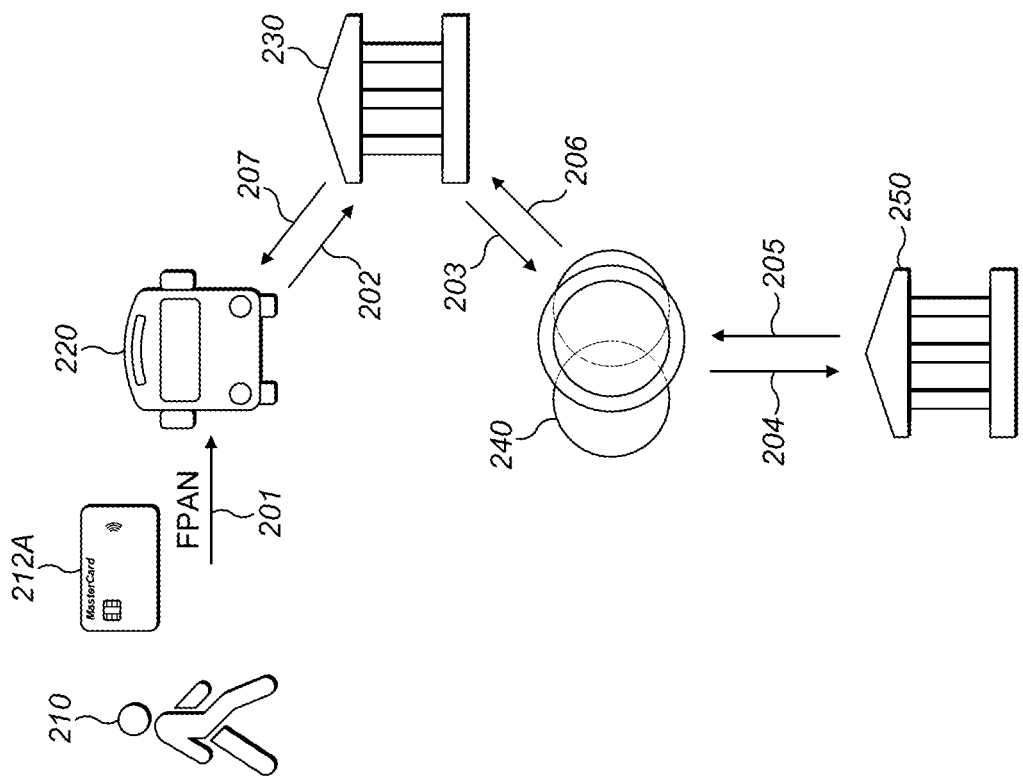
FIG. 2A illustrates a message flow.

FIGS. 2A and 2B illustrate a problem merchants such as transit agencies can encounter when customers have multiple payment devices linked to their bank account.

FIG. 2A illustrates a message flow when a customer 210 uses a primary payment device, such as a debit card 212A, to gain access to a transit system.

At 201, the customer taps their card on a payment terminal of a transit agency 220. At 202 (which may be several minutes or hours later if a deferred or aggregation payment model is used by the transit agency) a transaction request is passed to the transit agency's bank 230. At 203 the request is passed on to a payment system network 240 then on to the card issuer 250 at 204. The issuer declines the transaction and the transit agency learns of this via message flow 205, 206, 207, whereupon it blocks the payment device credentials from further travel, e.g. by adding them to a deny list stored on each terminal which is checked every time a payment terminal of the transit agency is used. The value added to the deny list could for example be a code formed by hashing the PAN with the expiry date and the sequence number to produce a value unique to each set of payment credentials.

FIG. 2B illustrates a nearly identical message flow when the customer 210 uses a secondary payment device, such as an NFC payment enabled smartphone 212B enabled for payment from the same account as their card 212A, to gain access to the transit system. The only difference between the message flows in FIGS. 2A and 2B is that the payment credentials comprised in the messages relate to the primary payment device in FIG. 2A (e.g. comprising a card FPAN) and the secondary payment device in FIG. 2B (e.g. comprising a smartphone DPAN). The message flows of FIGS. 2A and 2B can occur in either order, and can be preceded, followed or interposed by one or more further similar message flows comprising credentials related to further payment devices of the same customer 210, e.g. DPANs of a tablet and/or a smartwatch and/or an NFC sticker and/or an NFC key fob.

Thus, the number of rides the customer 210 can obtain on a declined authorisation is no longer limited by the number of card accounts they have, as was the case when there used to always be a one to one correspondence between accounts and PANs, but by the total of all the PANs the customer has access to through their various accounts and payment devices. Since a new DPAN is generated each time a customer requests one, the unscrupulous customer 210 could even gain further rides by disabling payments on their various devices, and enabling them again to obtain new DPANs. Depending on the agreed liability model, the transit agency may be liable for the spend on declined authorisations, meaning that the unscrupulous consumer may be able to travel indefinitely without making proper and legal payment for their travel.

A solution to this problem, which limits the number of rides obtainable after a declined authorisation to one per account, is to introduce a funding source proxy (FSP) which is identical for every payment device linked to an account and which is checked for each time a payment device is used.

Figure 3A:
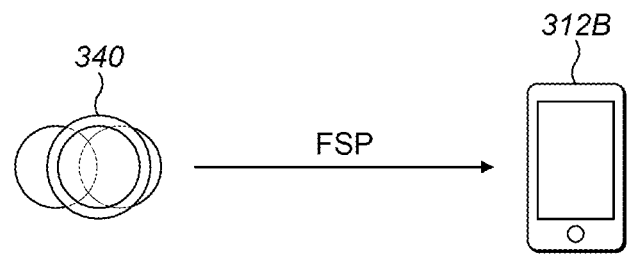
FIG. 3A illustrates the enablement of a secondary device for payments.

As illustrated by FIG. 3A, when a secondary payment device 312B is enabled for payments, it receives a provisioning payload from the payment system network 340. Traditionally, this payload would comprise all the credentials necessary for making payments; e.g. DPAN, expiry date, issue number etc. In the method of FIG. 3A however, the payload contains an FSP in addition to the usual credentials.

The FSP is linked to the primary payment device credentials, for example generated/calculated from them according to a predetermined algorithm. It could for example be a hash of the FPAN, card expiry and card sequence/issue number. Alternatively, it could be the payment account reference (PAR) data element under development by EMVCo, or similar. The algorithm used to calculate the FSP could be one-way; i.e. it could be impossible/impractical to determine the credentials input from the FSP output. It could also generate a unique FSP for each FPAN. The provisioning payload could be in the form of a signed (cryptographically protected) record.

Figure 3B:
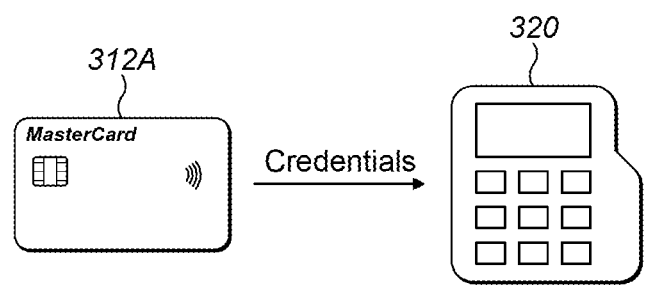
FIG. 3B illustrates use of a primary payment device at a payment terminal.

FIG. 3B illustrates use of a primary payment device 312A at a payment terminal. On receipt of credentials from any payment device, the merchant terminal 320 will check to see whether the credentials comprise an FSP. If not, as in the case shown, then an FSP is calculated from the credentials. If the transaction is later declined, this FSP is added to a deny list. (A deny list is a list of card credentials, typically stored in a hashed format, that the merchant, will block use of.)

Following such an addition to the deny list, the customer 310 may attempt to use a secondary payment device 312B to make a payment to the same merchant 320. However, the terminal then automatically checks for the FSP, and when found checks it against the deny list. On finding a match the payment terminal stops the customer 310 from obtaining the product or service they were attempting to access. This may for example be by way of a warning to a terminal operator, or by a gate to a transit service remaining closed.

Figure 3C:
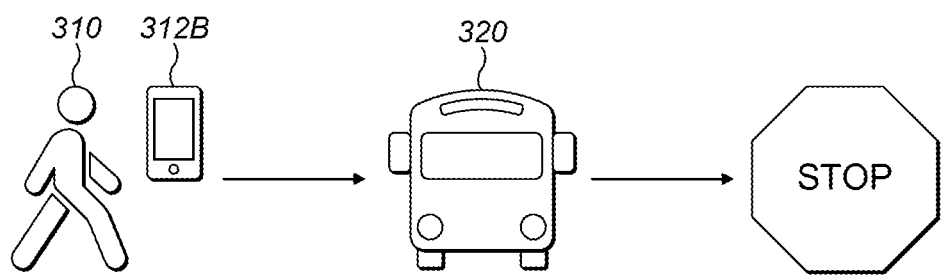
FIG. 3C illustrates the subsequent attempted use of a secondary payment device.

The processes shown in FIGS. 3B and 3C could occur in either order and/or with one or both of them repeated; customer 310 is always prevented from using the same account to gain more than one "free ride".

If, following addition of an FSP linked to their account to a deny list, a customer pays the debt due (and optionally, if the transit agency requires, pays a fine or a deposit in case of a subsequent "free ride"), the FSP can be removed from the deny list on receipt of a good authorisation for that payment from the issuer by the transit agency. This may be achieved for example by customer self-service via the transit agency's website, a call centre or a ticket machine, or at a ticket office.

Implementing such FSP procedures does not require any change to the current chip card issuing systems; each time a plastic card is presented to a reader the FSP will be calculated as that is the 'primary' set of credentials. Whenever a device is provisioned, the FSP is always personalised onto the device, thus when it is presented to a terminal, the FSP will be found and checked against the deny list. Authorisation logic can remain unchanged (i.e. the FPAN/DPAN logic does not need to change), only reader logic is modified.

Figure 3D:
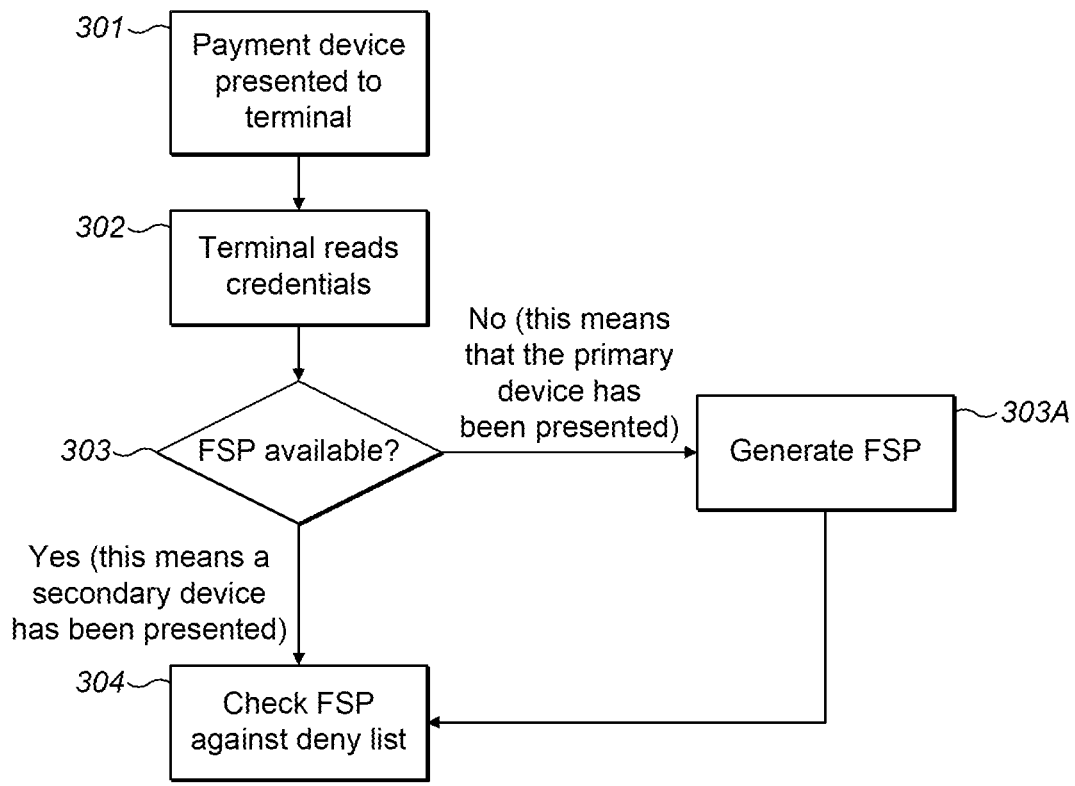
FIG. 3D is a flow chart of a procedure following presentation of a payment device to a terminal.

FIG. 3D is a flowchart illustrating the logical process involved. At 301 a payment device is presented to a payment terminal. At 302 the terminal reads the credentials received from the payment device. At 303 the terminal checks for an FSP amongst the credentials. If none is found then, at 303A, an FSP is generated from the credentials. Once an FSP has been found or generated, at 304 it is checked against a deny list.

FSPs could also be useful for other purposes than blocking "free ride" transactions. It is generally useful to a merchant to be able to identify repeat customers regardless of the payment device they choose to use for a particular transaction, for example to improve the service provided to the customer and/or gather data about an individual or demographics' habits which can be analysed to develop strategies for increasing revenue, decreasing waste etc. As such, step 304 of FIG. 3D could relate to, instead of checking the FSP against a deny list, checking it against a registered customer list. If the FSP is found on such a list then the record it is found in can be updated with data concerning the present transaction. Further, other information stored in a record with the FSP could be used to determine whether anything can be done to improve the customer's experience at that time. For example, the customer can be informed of loyalty points gained or given a voucher or free gift they have become eligible for according to a rewards scheme.

Figure 4:
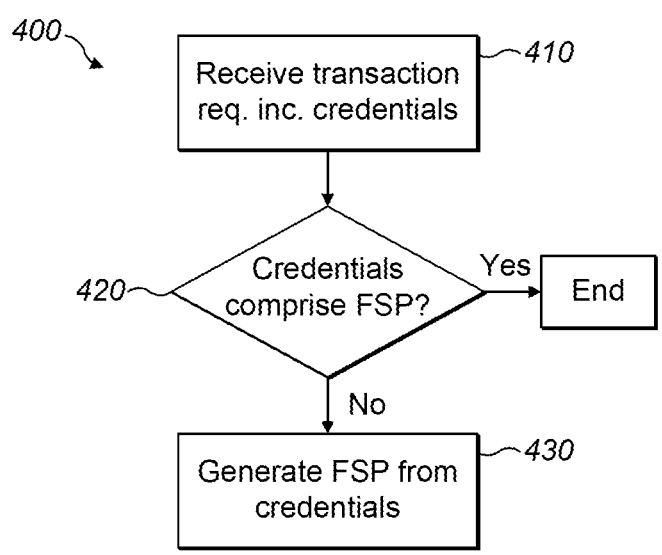
FIG. 4 is a flowchart of a method of a payment terminal identifying the funding source of an electronic transaction.

FIG. 4 is a flowchart of a method 400 of a payment terminal identifying the funding source of an electronic transaction. At 410 the terminal receives a transaction request comprising one or more credentials from a payment device. At 420 the terminal determines whether said credentials comprise an FSP and, if not, at 430 generates the FSP from one or more of said credentials according to a predetermined algorithm stored on the terminal, the FSP being derived from an FPAN of a funding source of the payment device.

Figure 5:
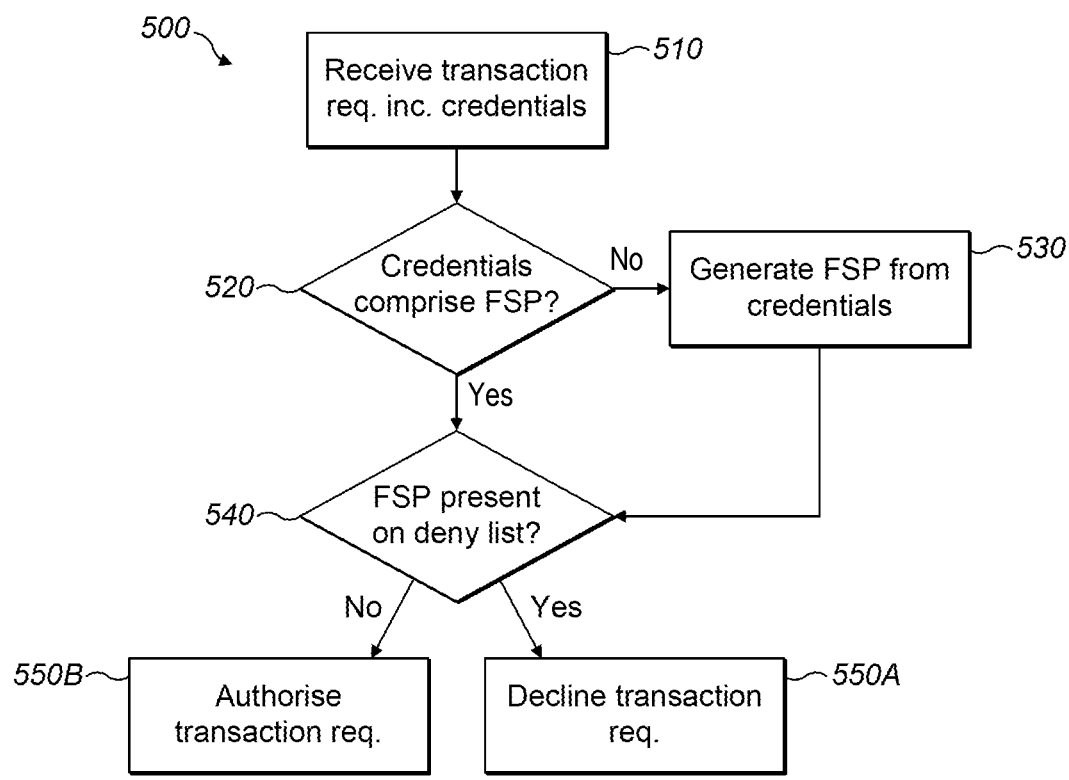
FIG. 5 is a flowchart of a method of a payment terminal processing an electronic transaction.

FIG. 5 is a flowchart of a method 500 of a payment terminal processing an electronic transaction. At 510, the terminal receives a transaction request comprising one or more credentials from a payment device. At 520 the terminal determines whether said credentials comprise an FSP and, if not, at 530 generates the FSP from one or more of said credentials according to a predetermined algorithm stored on the terminal, the FSP being derived from an FPAN of a funding source of the payment device. At 540, the terminal determines whether or not the FSP is present on a deny list. If so, at 550A the terminal declines the transaction request and, if not, at 550B the terminal authorises the transaction request.

Figure 6A:
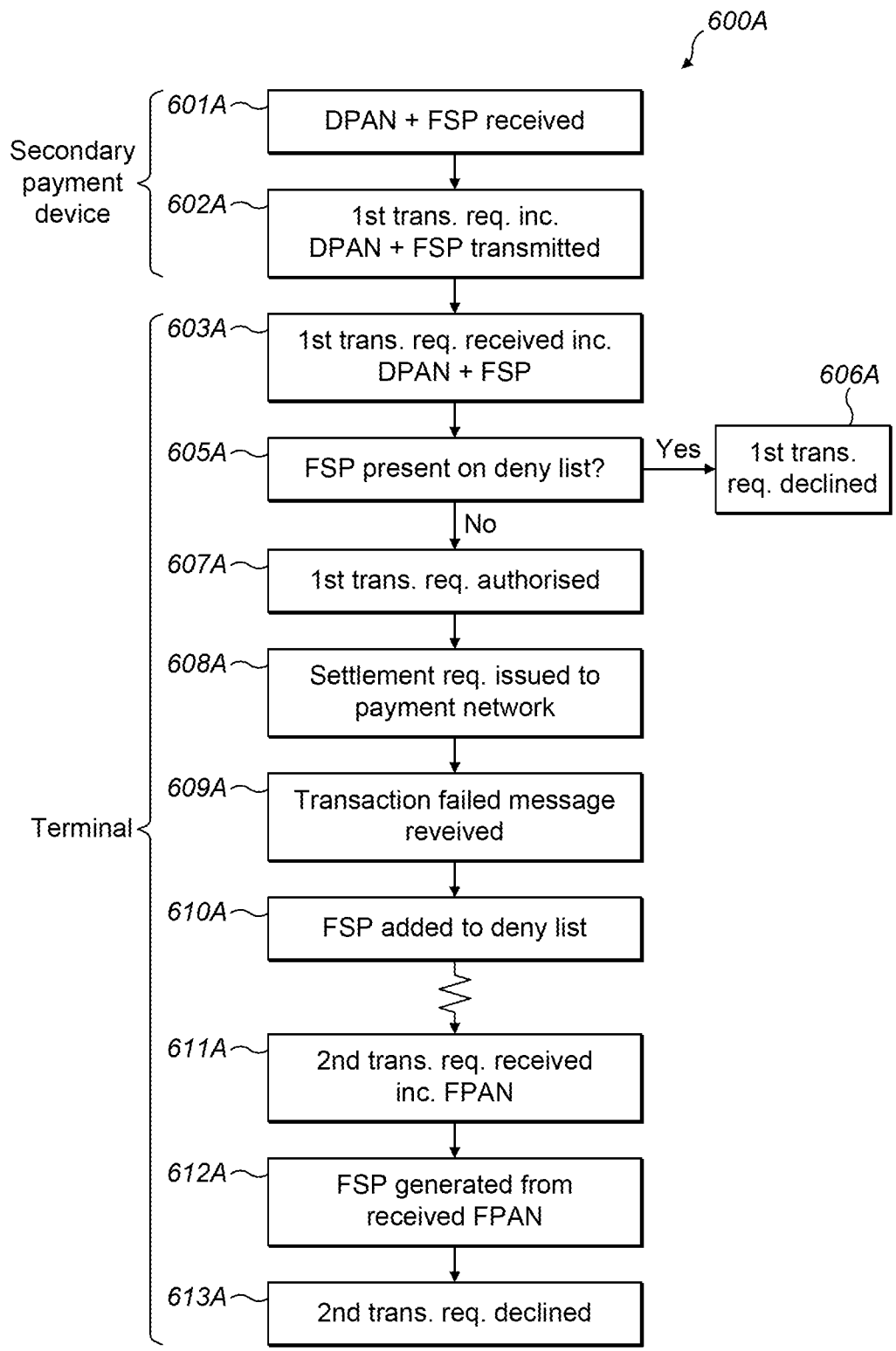
FIG. 6A is a flow chart of an example method.

FIG. 6A is a flowchart of a method 600A. At 601A, a secondary payment device receives a DPAN and an FSP derived from an FPAN of a funding source according to a predetermined algorithm. At 602A, the secondary payment device transmits a first transaction request comprising said DPAN and said FSP to a payment terminal. At 603A, the payment terminal receives the first transaction request. Responsive thereto, at 605A the terminal checks whether the FSP is present on a deny list. If so, at 606A the terminal declines the first transaction request. If not, at 607A the terminal authorises the first transaction request. Then, at 608A, the terminal issues a request comprising the DPAN to a payment network for settlement of the transaction. Later, at 609A, the payment terminal receives a transaction failed message comprising the DPAN (or some other data identifying the failed transaction or the funding source) from the payment network. Responsive thereto, at 610A the terminal adds the FSP to the deny list. Subsequently, the terminal receives a second transaction request comprising the FPAN at 611A. Responsive thereto, at 612A the terminal generates the FSP from the received FPAN according to said predetermined algorithm, which is stored on the terminal. At 613A the terminal determines that the FSP is present on the deny list and declines the second transaction request.

Figure 6B:
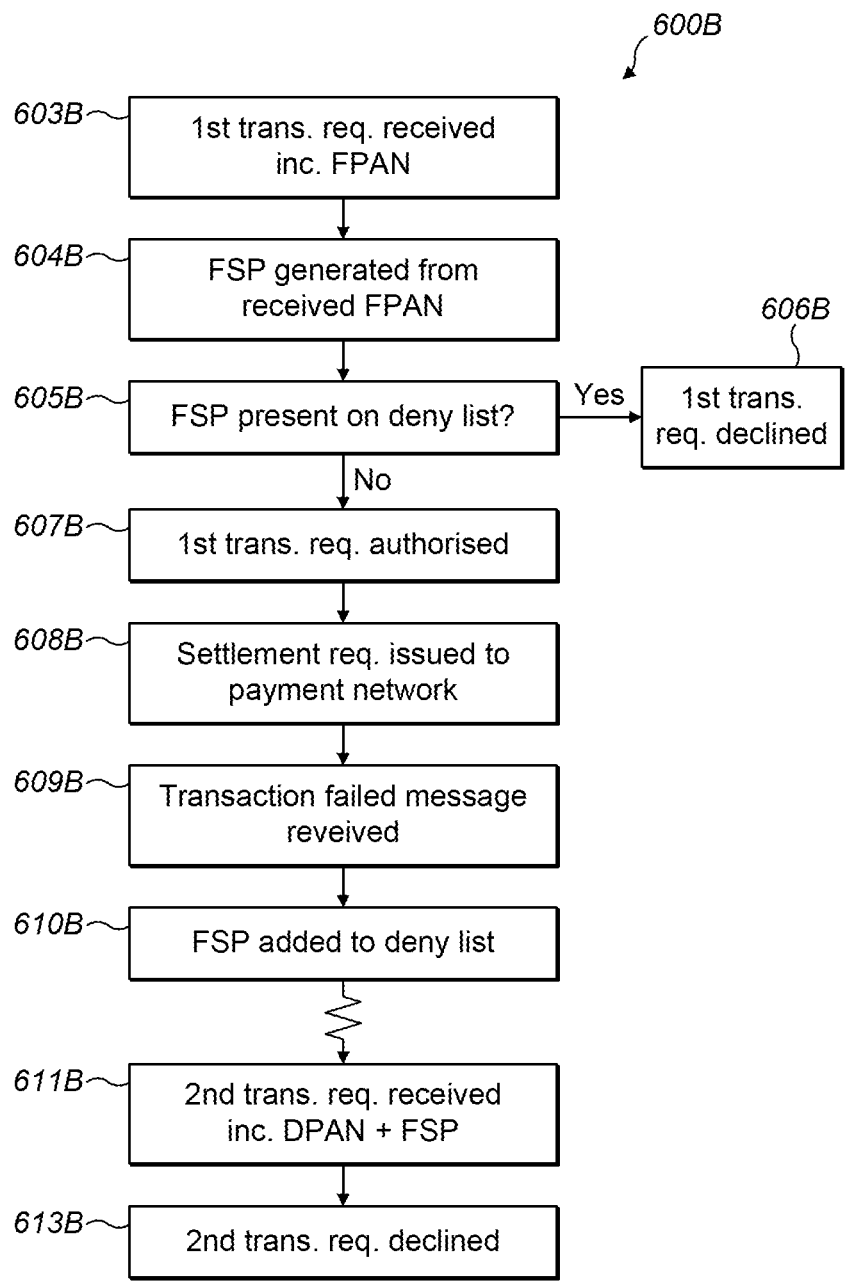
FIG. 6B is a flow chart of another example method.

FIG. 6B is a flowchart of a method 600B. At 603B, a payment terminal receives a first transaction request comprising an FPAN of a funding source. Responsive thereto, at 604B the terminal generates an FSP from said FPAN according to a predetermined algorithm stored on the terminal. At 605B the terminal checks whether the FSP is present on a deny list. If so, at 606B the terminal declines the transaction request. If not, at 607B the terminal authorises the transaction request. Then, at 608B, the terminal issues a request comprising the FPAN to a payment network for settlement of the transaction. Later, at 609B, the terminal receives a transaction failed message comprising the FPAN (or some other data identifying the failed transaction or the funding source) from the payment network. Responsive thereto, at 610B, the terminal adds the FSP to the deny list. Later, at 611B, the terminal receives a further transaction request comprising a DPAN and the FSP. At 613B, the terminal determines that the FSP is present on the deny list and declines the transaction request.

Figure 7:
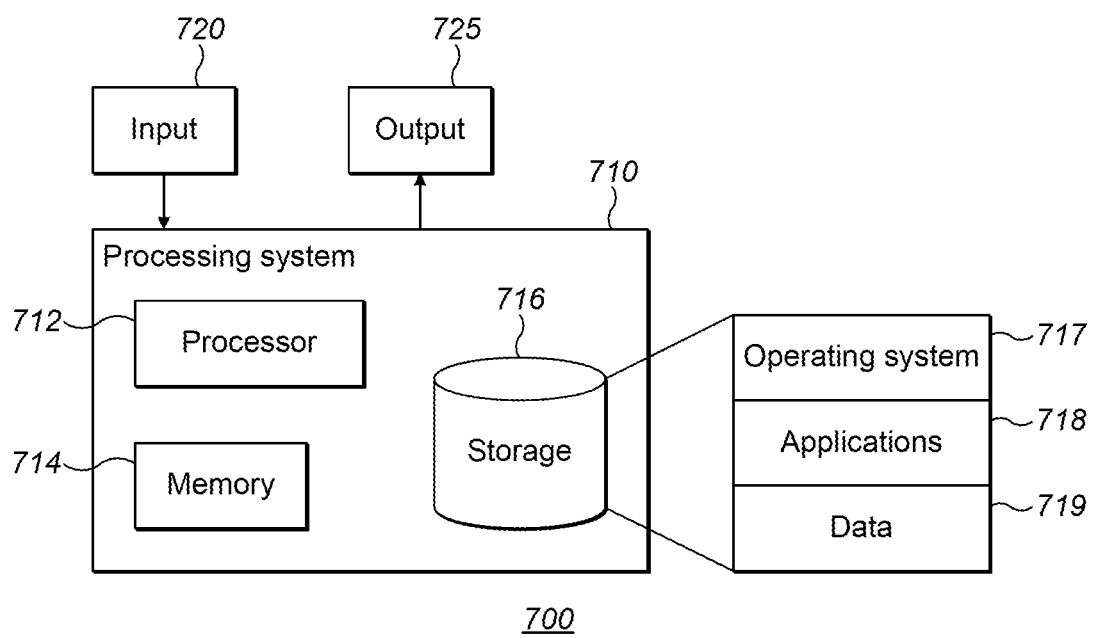
FIG. 7 depicts an example of a system that facilitates the processing of payment transactions at payment terminals.

FIG. 7 depicts an example of a system 700 that facilitates the processing of payment transactions at payment terminals. The system 700 includes a processing system 710 comprising processor(s) 712, memory 714, and storage device(s) 716. Furthermore, the processing system 710 is coupled to input device(s) 720, such as a keyboard, a mouse, a touchscreen, a microphone, etc., and output device(s) 725 such as a display, a speaker, an indicator light etc. The storage device(s) 716 stores an operating system 717, application(s) 718, and data 719.

The application(s) 718 can include instructions, which when executed by the processing system 710, can cause the system 710 to perform/execute methods, operations, and/or processes described above with respect to FIGS. 3A to 6B. For example, the application(s) 718 can include instructions for processing payment transactions by a merchant, if the system 700 is implemented on the merchant's side, instructions for processing payment transactions by an issuer, a payment system network, or another payment processing facilitator, if the system 700 is implemented respectively on the issuer's side, the payment system network, or the other payment processing facilitator's side, or instructions for effecting a mobile transaction if the system 700 is implemented on a payment device.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a generator readable medium, including, without limitation, non-transitory generator-readable storage, a storage device, and/or a memory device. Such instructions, when executed by a processor (or one or more generators, processors, and/or other devices) cause the processor (the one or more generators, processors, and/or other devices) to perform at least a portion of the methods described herein. A non-transitory generator-readable storage medium includes, but is not limited to, volatile memory, non-volatile memory, magnetic and optical storage devices such as disk drives, magnetic tape, CDs (compact discs), DVDs (digital versatile discs), or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded generator devices, personal generators, server generators (specific or cloud (virtual) servers), hand-held or laptop devices, multiprocessor systems, microprocessor-based systems, set top boxes, programmable consumer electronics, mobile telephones, network PCs, minigenerators, mainframe generators, distributed generating environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

What is claimed is:

1. A method of improving security of an electronic transaction comprising a secondary payment device:
   receiving a device primary account number (DPAN) and a funding source proxy (FSP) derived from a funding primary account number (FPAN) of a funding source according to a predetermined algorithm; and
   transmitting a secondary payment device transaction request comprising said DPAN and said FSP to a payment terminal;
   wherein the DPAN is specific to said secondary payment device, and wherein the FSP corresponds to the funding source such that an identical FSP is derived for said secondary payment device and for at least another payment device associated with the funding source;

further comprising the payment terminal, prior to receiving said secondary payment device transaction request:
receiving a primary device transaction request comprising said FPAN;
responsive thereto, generating the FSP from the received FPAN according to said predetermined algorithm stored on the payment terminal;
responsive thereto, determining that the FSP is not present on a deny list stored at the payment terminal;
responsive thereto, authorizing said primary device transaction request;
issuing a request comprising the FPAN to a payment network for settlement of said transaction;
subsequent to issuing said request comprising the FPAN to said payment network, receiving a primary device transaction failed message from the payment network; and
responsive thereto, adding the FSP to a deny list stored at the payment terminal;
the payment terminal subsequently:
receiving said secondary payment device transaction request;
responsive thereto, determining that the received FSP is present on said deny list; and
responsive thereto, declining said secondary payment device transaction request;
wherein the FSP generated for the primary device transaction request is identical to the FSP derived for the secondary device transaction request.

2. A method of improving security of an electronic transaction comprising a payment terminal:
receiving a secondary payment device transaction request comprising a device primary account number (DPAN) and a funding source proxy (FSP) derived from a funding primary account number (FPAN) of a funding source according to a predetermined algorithm, wherein the DPAN is specific to a secondary payment device from which the transaction request is received, and wherein the FSP corresponds to the funding source such that an identical FSP is derived for said secondary payment device and for at least another payment device associated with the funding source;
responsive thereto, determining that the FSP is not present on a deny list stored at the payment terminal;
responsive thereto, authorizing said secondary payment device transaction request;
issuing a request comprising the DPAN to a payment network for settlement of said transaction;
subsequently receiving a secondary payment device transaction failed message from the payment network;
responsive thereto, adding the FSP to said deny list;
subsequently receiving a second primary device transaction request comprising said FPAN;
responsive thereto, generating the FSP from the received FPAN according to said predetermined algorithm stored on the payment terminal;
responsive thereto, determining that said generated FSP is present on the deny list; and
responsive thereto, declining said second primary device transaction request;
wherein the FSP generated for the second primary device transaction request is identical to the FSP derived for the secondary payment device transaction request.

3. The method of claim 2, further comprising the payment terminal, prior to receiving said secondary payment device transaction request:
receiving a first primary device transaction request comprising said FPAN;
responsive thereto, generating the FSP from the received FPAN according to said predetermined algorithm stored on the payment terminal;
responsive thereto, determining that the FSP is not present on a deny list stored at the payment terminal;
responsive thereto, authorizing said first primary device transaction request;
issuing a request comprising the FPAN to a payment network for settlement of said transaction; and
subsequent to issuing said request comprising the FPAN to said payment network, receiving a primary device transaction approved message from the payment network.

4. A payment terminal for improving security of an electronic transaction comprising:
a receiver configured to receive from a secondary payment device a secondary payment device transaction request comprising a device primary account number (DPAN) and a funding source proxy (FSP) derived from a funding primary account number (FPAN) of a funding source according to a predetermined algorithm, and to receive from a primary device a primary device transaction request comprising the FPAN;
a memory storing a deny list; and
a processor, operatively coupled to said receiver and said memory, configured to:
determine that the FSP is not present on said deny list and, responsive thereto, authorize said secondary payment device transaction request;
issue a request comprising the DPAN to a payment network for settlement of said transaction;
subsequently receive a secondary payment device transaction failed message from the payment network;
responsive thereto, add the FSP to said deny list;
subsequently receive from a primary device a primary device transaction request comprising said FPAN;
responsive thereto, generate the FSP from the received FPAN according to said predetermined algorithm stored on the payment terminal;
responsive thereto, determine that said generated FSP is present on the deny list; and
responsive thereto, decline said primary device transaction request;
wherein the DPAN is specific to the secondary payment device from which the transaction request is received, and wherein the FSP corresponds to the funding source such that an identical FSP is derived for said secondary payment device and for said primary device associated with the funding source.

5. A system for improving security of an electronic transaction comprising:
a secondary payment device, in turn comprising:
a receiver configured to receive a device primary account number (DPAN) and a funding source proxy (FSP) derived from a funding source primary account number (FPAN) of a funding source according to a predetermined algorithm;
a processor, operatively coupled to said receiver, configured to extract said DPAN and said FSP from one or more received messages; and
a transmitter, operatively coupled to said processor, configured to transmit a secondary payment device transaction request comprising the DPAN and the FSP to a payment terminal; and a payment terminal, in turn comprising:
   a receiver configured to receive from said secondary payment device a secondary payment device transaction request comprising a device primary account number (DPAN) and a funding source proxy (FSP) derived from a funding primary account number (FPAN) of a funding source according to a predetermined algorithm;
   a memory storing a deny list; and
   a processor, operatively coupled to said receiver and said memory, configured to:
      determine that the FSP is not present on said deny list and, responsive thereto, authorize said secondary payment device transaction request;
      issue a request comprising the DPAN to a payment network for settlement of said transaction;
      subsequently receive a secondary payment device transaction failed message from the payment network;
      responsive thereto, add the FSP to said deny list;
      subsequently receive from a primary device a primary device transaction request comprising said FPAN;
      responsive thereto, generate the FSP from the received FPAN according to said predetermined algorithm stored on the payment terminal;
      responsive thereto, determine that said generated FSP is present on the deny list; and
      responsive thereto, decline said primary device transaction request;
wherein the DPAN is specific to said payment device from which the transaction request is received, and wherein the FSP corresponds to the funding source such that an identical FSP is derived for said secondary payment device and for said primary device associated with the funding source.

* * * * *